Nov. 1, 1927.
M. G. HUBBARD
FLUID VALVE
Filed Aug. 5, 1924
1,647,359
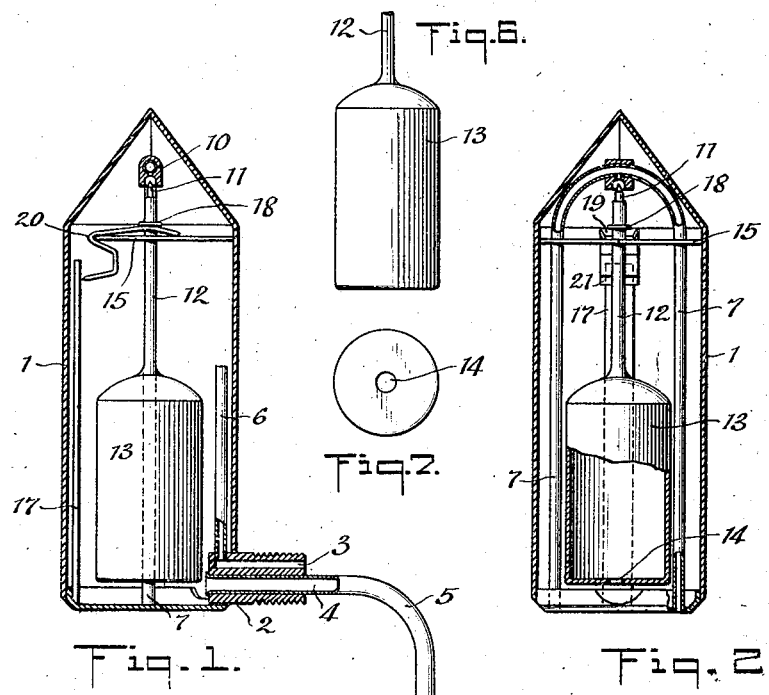
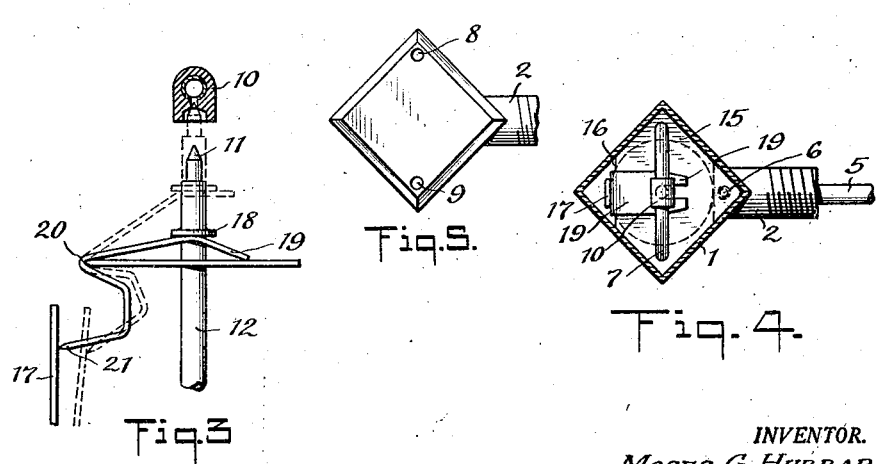
INVENTOR.
MOSES G. HUBBARD
BY
ATTORNEYS.

Patented Nov. 1, 1927.

1,647,359

UNITED STATES PATENT OFFICE.

MOSES G. HUBBARD, OF CHATHAM, NEW JERSEY.

FLUID VALVE.

Application filed August 5, 1924. Serial No. 730,154.

My invention relates to certain new and useful improvements in valves for air, steam or other fluids, and especially to valves operated by thermostatic and hydrostatic means. It will be found to be particularly useful in the construction of air valves for steam heating systems, and especially for use with the type known as a single pipe gravity return system.

Proper operation of such systems requires that provision be made for the rapid and easy venting of air, while at the same time automatically preventing the escape of steam or of water which may have been trapped in the system. In other words, to obtain a maximum efficiency the valve must remain open at all times necessary to clear the system from air, but must automatically close and prevent the escape of any steam or water which may accumulate in the system. In addition, it is necessary that the valve itself be capable of promptly clearing itself of water and capable of opening and closing as rapidly and effectively as may be necessary to accomplish the desired result.

My invention is particularly adapted to perform these desired functions and for purposes of illustration, I have shown and will now describe one form of valve which I have found to be satisfactory and efficient. It will be understood, of course, that the invention may be embodied in forms and structures other than the particular one herein described, and that various modifications and changes may be made in the construction without departing from the spirit of the invention.

In the form of valve illustrated, Figure 1 is a side sectional view of a form of valve ready for attachment to a steam radiator, and Figure 2 is a similar sectional view taken at right angles to Figure 1. Figure 3 is an enlarged detail view of the thermostatically operating mechanism, and Figure 4 is a top or plan view of the valve with the upper end of the casing removed. Figure 5 is a bottom view of the valve, Figure 6 an elevation of the float, and Figure 7 is a bottom view of the same.

The valve proper consists of a casing 1, which is preferably of a rectangular or square vertical cross section. It is preferably formed of sheet metal and is normally closed, except at the vents to be hereafter described. In the lower end of the casing is secured the radiator connection or nipple or spud 2, having two ports or passage-ways 3 and 4, in the latter of which is permanently secured a depending pipe 5, the purpose of which will be hereafter described. An upright tube or riser 6 is also connected to the inner end of the coupling and communicates with passage 3 at its inner end. An inverted U-shaped tube 7 is disposed within the casing, the outer ends of which extend through the bottom of the casing and form vents 8 and 9 for the escape of air, and the center or upper portion of the tube is provided with an aperture 10 forming a valve seat adapted to cooperate with the pointed end of the rod 12, secured to the float 13 which constitutes the hydrostatic operating means. This float consists of a hollow metal shell entirely closed except for a perforation 14 in the bottom thereof, and its operation will be hereafter more fully described. Near the upper end of the tube and within the valve casing is secured the supporting plate 15. This plate is a rectangular shape, except that one corner as at 16, is cut away to form a bearing surface for the thermostatic operating lever. The center of the plate 16 is provided with an aperture of sufficient size to permit the passage of the rod 12 and flange 18 therethrough and the thermostatic mechanism comprises an upright bi-metallic element 17, the lower end of which is secured to the bottom of the casing, the upper end being free to move under change of temperature conditions within the valve casing. The rod 12 carries near its upper end a circular projection or a flange 18, and there is finally provided a bell-crank lever 19, disposed as shown, that is, the upper outer end is slotted and engages the rod 12 just below the flange 18, the center portion 20 forms with the cut off edge of the plate 15 a knife-edge fulcrum upon which the lever rocks, and the lower knife-edge end 21 normally bears against the inner face of the upper end of the bi-metallic strip 17 and is rocked thereby as changes of temperature take place.

The operation of the valve will be readily understood. When the valve is in place upon a steam radiator and before the admission of the steam, the parts will be as shown in Figures 1 and 2, that is, the float 13 in its lowermost position and supported by the flange 18 bearing upon the forked end of the lever 19. When steam is admitted to the system, air is forced into the valve casing through the passage-ways 3 and 4 and passes out through the valve seat 10, and thence through vents 8 and 9. Should water be present in the system and forced up into the valve casing, it rises therein and entering the aperture 14 also rises into the lower portion of the float 13, compressing the air in the upper portion thereof. As soon as sufficient water enters the casing to lift the float, the latter rises and immediately closes valve 10, thereby preventing the escape of any water into the room. Any increase in pressure tends to maintain the valve upon its seat, and this condition continues until sufficient water in the valve casing drains back through apertures 4 and pipe 5, as will eventually occur in the normal operation of the system. As soon, however, as the water level in the casing drops below the point sufficiently to sustain the float, the latter moves downwardly and opens the valve 10, thereby relieving the pressure and permitting the flow of air or steam into the upper part of the casing through the aperture 3 and tube 6. This operation is repeated so long as these respective conditions continue to occur, and these successive ventings free the system of water and eventually permit the steam to reach the interior of the casing. When this occurs, the chamber becomes heated and with it the thermostatic element 17 which flexes to the right (see dotted lines in Figure 3), thereby swinging the lever 19 upon its pivot 20, lifting the rod 12 and closing the valve 10. So long as a proper temperature is maintained within the casing this valve remains closed and all danger of the escape of steam is prevented, but should the radiator cool off for any reason below the predetermined point, the thermostatic element retracts and thereby permits the valve 10 to open and the air to escape.

The form of float above described will be found to possess peculiar advantages over those heretofore in use, as it is not only extremely responsive in closing the valve upon any influx of water, but is positive and reliable in opening the valve when the water level in the casing recedes. A float of my construction, while possessing the buoyancy necessary for closing the valve, in effect constitutes an automatically variable control element, in that whatever water is forced up into the float through the perforation by the pressure remains temporarily within the float, adding its weight to that of the float, and thus increases the mass by means of which gravity is able to unseat the valve. For instance, if ten pounds of pressure is present, when water enters the valve it would be forced up into the float so as to occupy approximately one-third of its cubical contents. This very nearly doubles the weight effective for opening the valve. At the same time, as the confined air in the float is expanded by the rising in temperature, it eventually clears the float of this water and restores to it its original buoyancy.

It will be readily understood from the foregoing that the apparatus is not only extremely simple in construction but highly efficient, and adapted to operate rapidly and effectively to accomplish the results sought. All air, no matter what the pressure, is allowed to escape freely, thereby venting the system, and automatically placing it in condition to receive the steam. All water, however, whether trapped in the system or formed by condensation in any part thereof, is prevented from escaping, for the valve 10 is always closed by the float 13 before the water level of the casing reaches a point where it can escape through said valve. In like manner all steam is trapped in the valve casing for, as soon as the temperature therein rises sufficiently to heat the thermostatic element to the desired temperature, the latter automatically flexes, operating the lever 19 and thereby likewise closes the valve.

It is important that the total vertical length of the pipe 5 shall be slightly greater than the height of the tube 6, as this insures at all times proper drainage conditions. It is also important that the upper open end of the tube be located slightly above the top of the float in its open valve or normal position, so that steam or air may enter the upper portion of the casing likewise permitting the outward passage of any water therein.

It is obvious that the several features of my invention are susceptible of independent use and that various modifications and changes from the structure illustrated may be made without departing from the spirit thereof.

What I claim and desire to secure by Letters Patent is:

1. In a buoyancy and gravity actuated valve, a casing, a float having a sealed top and a partially closed but normally unsealed base, and independent means for clearing said casing of water when said valve has been closed.

2. In a buoyancy and gravity actuated valve, a casing, a float having a sealed top and a partially closed but normally unsealed base, and means operable after the valve has been closed to clear said casing of water to unseal said base.

3. A valve constructed to be seated by buoyancy and unseated by gravity and comprising a casing, a fluid intake, an air outlet port, a closing device for said port, and a float for seating and unseating said closing device, having a sealed top and a partially closed, but normally unsealed base.

4. A valve constructed to be seated by buoyancy and unseated by gravity and comprising a casing, a fluid intake, an air outlet port, a closing device for said port, and a float for seating and unseating said closing device having a sealed top and a base having a restricted opening normally unsealed.

5. In a fluid valve, the combination of a valve member, a float, and thermostat means co-acting to seat and unseat said member, said float being circular in cross section and said thermostat means including an elongate thermostat member, and a casing of polygonal cross section whereby the flat sides thereof guide the rise and fall of the float and the corners provide elongate chambers parallel to the axis of the float one for housing the elongate thermostat member substantially parallel to the axis of the float.

6. In an air valve the combination with a cylindrical float, of a casing of polygonal cross section enclosing said float, the flat sides of said casing forming guides which direct vertical movements of the float and the corners of the casing forming vertical channels beyond the bounds of the float, and a U shaped vent tube having one of its legs disposed in one of said channels and the other leg disposed in the opposite channel.

7. An air valve including a casing and a vent tube of inverted U shape therein, both ends of the U tube being extended through the base of said casing and being open to the atmosphere.

8. In an air valve the combination with a cylindrical float of a casing of polygonal cross section enclosing said float, the flat sides of the casing acting as guides for directing rising and falling movements of said float, said sides forming a series of longitudinal channels beyond the bounds of the float.

9. In an air valve, the combination of a rectangular casing, a cylindrical float, a thermostatic member mounted in one corner, a tubular inward vent mounted in another corner, and a U shaped tubular outlet having a leg in each of the remaining corners of said casing.

10. A valve seat and closing member for closing said seat, a float chamber and a float therein, connections between said float and said closing member whereby, when the float rises said member closes against said seat, connections to said float chamber for admitting and draining fluid therefrom, said float being hollow and having a restricted orifice below the buoyancy level whereby, when water is admitted to said float chamber the full effect of the buoyancy of the float is obtained to close said valve against said seat, but while said valve is floating liquid is admitted to its lower portion, so that when the liquid is drained from the float chamber the weight of the liquid in the float assists in opening the valve before the liquid has drained from the float chamber.

11. In a float valve the combination of a float chamber, a valve therein, means for controlling said valve by the buoyancy of a float adapted to alter the buoyancy of said float by the pressure in said casing, and means to drain water from said float chamber to a level materially below the buoyancy level of said float when said valve is closed.

12. In a fluid valve the combination of a float chamber, a valve operating float having an opening below the floating water level and adapted to accumulate therein enough of the float buoyancy water to materially affect the weight of the float, and means for draining said chamber adapted to insure that the casing may be drained and the valve opened before the water accumulated in the float drains therefrom.

13. In a buoyancy and gravity actuated valve, a float chamber, means to drain water therefrom intermediate the height of the chamber to limit the water level therein, a hollow float having a sealed top and a constricted opening communicating with said water at a point materially below the floating water level of said float, a valve and means to operate said valve from said float.

14. In a float valve, the combination of a float chamber and a valve, means for operating said valve by flotation, including a float of variable weight, and means to drain water from said chamber to cause said float to sink.

MOSES G. HUBBARD.